(12) United States Patent
Faaborg et al.

(10) Patent No.: US 10,795,449 B2
(45) Date of Patent: Oct. 6, 2020

(54) METHODS AND APPARATUS USING GESTURES TO SHARE PRIVATE WINDOWS IN SHARED VIRTUAL ENVIRONMENTS

(71) Applicant: GOOGLE INC., Mountain View, CA (US)

(72) Inventors: Alexander James Faaborg, Mountain View, CA (US); Chris McKenzie, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 569 days.

(21) Appl. No.: 15/374,299

(22) Filed: Dec. 9, 2016

(65) Prior Publication Data
US 2017/0168585 A1    Jun. 15, 2017

Related U.S. Application Data

(60) Provisional application No. 62/266,350, filed on Dec. 11, 2015.

(51) Int. Cl.
*G06F 3/01* (2006.01)
*G06Q 10/10* (2012.01)
(Continued)

(52) U.S. Cl.
CPC .............. *G06F 3/017* (2013.01); *G06F 3/011* (2013.01); *G06F 3/013* (2013.01); *G06F 3/0304* (2013.01); *G06F 3/0481* (2013.01); *G06F 3/04815* (2013.01); *G06F 3/147* (2013.01); *G06F 3/1454* (2013.01); *G06F 21/60* (2013.01); *G06Q 10/10* (2013.01); *G06T 19/006* (2013.01);
(Continued)

(58) Field of Classification Search
CPC .......... G06F 3/017; G06F 3/011; G06F 3/013; G06F 3/0304; G06F 3/0481; G06F 3/04815; G06F 3/1454; G06F 3/147
See application file for complete search history.

(56) References Cited

U.S. PATENT DOCUMENTS

| 5,107,443 A | 4/1992 | Smith et al. |
| 5,911,045 A | 6/1999 | Leyba et al. |

(Continued)

FOREIGN PATENT DOCUMENTS

WO    2013028908 A1    2/2013

OTHER PUBLICATIONS

International Search Report and Written Opinion received for PCT Patent Application No. PCT/US2016/066138, dated May 15, 2017, 22 pages.

(Continued)

*Primary Examiner* — Tadesse Hailu
(74) *Attorney, Agent, or Firm* — Brake Hughes Bellermann LLP

(57) ABSTRACT

Methods and apparatus using gestures to share private windows in shared virtual environments are disclosed herein. An example method includes detecting a gesture of a user in a virtual environment associated with a private window in the virtual environment, the private window associated with the user, determining whether the gesture represents a signal to share the private window with another, and, when the gesture represents a signal to share the private window, changing the status of the private window to a shared window.

22 Claims, 10 Drawing Sheets

(51) Int. Cl.
*G06F 3/14* (2006.01)
*G06F 3/0481* (2013.01)
*G06F 3/03* (2006.01)
*G06F 21/60* (2013.01)
*G06F 3/147* (2006.01)
*G06T 19/00* (2011.01)
*H04N 21/4788* (2011.01)

(52) U.S. Cl.
CPC .............. *G06F 2203/04803* (2013.01); *G06F 2221/2141* (2013.01); *G06T 2219/024* (2013.01); *G09G 2370/16* (2013.01); *H04N 21/4788* (2013.01)

(56) References Cited

U.S. PATENT DOCUMENTS

| | | | |
|---|---|---|---|
| 6,198,462 B1* | 3/2001 | Daily | G02B 27/2228 345/8 |
| 6,421,047 B1 | 7/2002 | De Groot | |
| 2003/0076353 A1 | 4/2003 | Blackstock et al. | |
| 2008/0294992 A1* | 11/2008 | Liang | G06F 3/0481 715/733 |
| 2011/0083111 A1* | 4/2011 | Forutanpour | H04W 4/21 715/863 |
| 2011/0249024 A1* | 10/2011 | Arrasvuori | G06F 3/017 345/629 |
| 2012/0191832 A1* | 7/2012 | Kim | H04L 12/2812 709/223 |
| 2012/0304077 A1* | 11/2012 | Hornback, Jr. | G06F 3/1454 715/753 |
| 2013/0219303 A1* | 8/2013 | Eriksson | G06F 3/1454 715/759 |
| 2013/0342564 A1 | 12/2013 | Kinnebrew et al. | |
| 2014/0040762 A1* | 2/2014 | Kuscher | H04M 1/72519 715/748 |
| 2014/0368537 A1* | 12/2014 | Salter | G06F 3/011 345/633 |
| 2015/0067536 A1 | 3/2015 | Leorin et al. | |
| 2015/0149929 A1 | 5/2015 | Shepherd et al. | |
| 2015/0193979 A1 | 7/2015 | Grek | |
| 2016/0066184 A1* | 3/2016 | Bhargav-Spantzel | G06F 21/34 726/7 |
| 2017/0024100 A1* | 1/2017 | Pieper | G06F 3/0486 |
| 2017/0046037 A1* | 2/2017 | Dand | G06F 3/0486 |
| 2017/0344220 A1* | 11/2017 | Cook | G06F 3/04842 |

OTHER PUBLICATIONS

Written Opinion from PCT/US2016/66138, dated Oct. 31, 2017, 11 pages.
Alger, "Visual Design Methods for Virtual Reality", downloaded from http://aperturesciencellc.com/vr/VisualDesignMethodsforVR_MikeAlger.pdf, Sep. 2015, 98 pages.
Cuthbertson, "Virtual reality: Microsoft experiments with multi-user technology codenamed Comradre", IBTimes UK (http://www.ibtimes.co.uk/virtual-reality-microsoft-experiments-multi-user-technology-codenamed-comradre-1523566), Oct. 12, 2015, 3 pages.
Streuber, et al., "Human Interaction in Multi-User Virtual Reality", Max Planck Institute for Biological Cybernetics, Jan. 2007, 6 pages.
Wright, et al., "A Survey of Collaborative Virtual Environment Technologies", University of Notre Dame, 2008, 16 pages.
Invitation to Pay Additional Fees and Partial Search Report received for PCT Patent Application No. PCT/US2016/066138, dated Mar. 7, 2017, 6 pages.

* cited by examiner

METHODS AND APPARATUS USING GESTURES TO SHARE PRIVATE WINDOWS IN SHARED VIRTUAL ENVIRONMENTS

CROSS REFERENCE TO RELATED APPLICATION

This application claims the priority benefit of U.S. Provisional Patent Application No. 62/266,350, filed on Dec. 11, 2015, the entirety of which is incorporated herein by reference.

FIELD OF THE DISCLOSURE

This disclosure relates generally to virtual environments, and, more particularly, to methods and apparatus using gestures to share private windows in shared virtual environments.

BACKGROUND

Conventional virtual environments can provide users with private windows in which they can privately view and interact with their application(s), and can provide users with shared or public windows in which users can jointly view and interact with applications.

SUMMARY

Methods and apparatus using gestures to share private windows in shared virtual environments are disclosed herein. An example method includes method includes detecting a gesture of a user in a virtual environment associated with a private window in the virtual environment, the private window associated with the user, determining whether the gesture represents a signal to share the private window with another, and, when the gesture represents a signal to share the private window, changing the status of the private window to a shared window.

BRIEF DESCRIPTION OF THE DRAWINGS

Like reference symbols in the various drawings indicate like elements.

DETAILED DESCRIPTION

Figure 1:
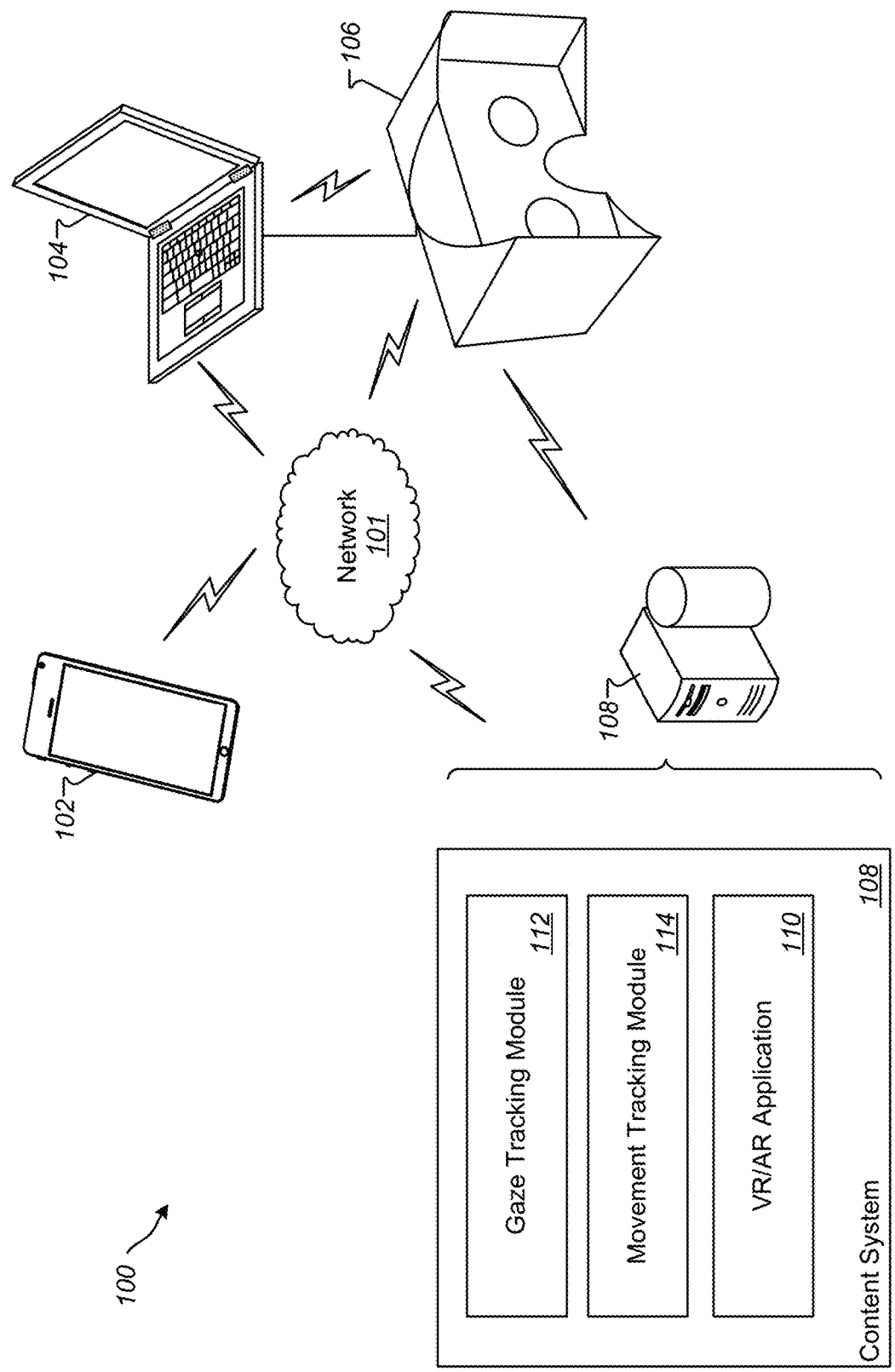
FIG. 1 is a block diagram of an example system for creating and interacting with a virtual environment to share private windows in accordance with this disclosure.

Example virtual environments include augmented reality (AR) and virtual reality (VR) systems, scenes and/or spaces. Virtual environments include virtual elements, windows, images, etc., which may be computer-generated. A virtual environment may be two-dimensional (2D) and/or three-dimensional (3D). In conventional virtual environments, a user can have private windows (e.g., private windows that are virtual windows in a virtual environment) in which they can view and interact with their applications in a private virtual space. However, those windows are only visible to themselves, even if they are in a shared (e.g., public, social, work, etc.) virtual environment with other users. Accordingly, the examples disclosed herein enable a user to use gestures to signal (e.g., indicate, direct, signify, etc.) that they want to selectively move a private window from their private virtual environment into a shared (e.g., public, social, work, etc.) virtual environment. A window can be shared by, for example, having its status or state changed or set so that other users can see contents of the window, see their own inputs, see the inputs of other users, change the contents of the window, etc. For readability, the term window is used herein, however, it should be understood that reference could have been made to any physical, computer, virtual, etc. graphical control element that allows a user to view content and/or provide input.

In the shared virtual environment, the shared private window becomes shared with (e.g., accessible to) at least one other. The other(s) may be any number and/or combination(s) or local or remote entities in the form of a physical user, a virtual user, a virtual assistant, a computer, a computing platform, a mobile device, etc. For readability, reference will simply be made herein to sharing a window, or a variant thereof, without any restriction on or need to specify to what entity a window is being shared. Use of other, another, who, one, etc. in connection with sharing a window is not restricted to users. A signal to share a window may be determined by, for example, detecting a gesture from a set of gestures, and then qualifying the gesture with more or more criteria, such as velocity, range of movement, etc. For example, when a pushing gesture moves a window beyond a distance threshold. This allows a gesture associated with moving the window to be recognized as a signal to share a private window. A user's private window may be shared locally and/or remotely. Gestures do not require an exact or precise movement. To reduce inadvertent sharing of private windows, an explicit confirmation may be requested of a user, before their private window is shared.

A private window may be a window in a private virtual environment accessible to the window owner. In some examples, a private window may be accessible to a set of people (e.g., a secretary, an assistant, a parent, etc.) and/or a set of virtual assistants identified or defined by a user. Additionally or alternatively, a private window may be accessible to only the user. A shared window may be a window in a shared virtual environment that is openly discoverable and/or accessible by others and/or other virtual assistants outside the identified set of people and virtual assistants. In some instances, the user can define who or what, if any, can access their private window. In this way, a user can easily or simply share privately visible windows, by for example, changing their status to shared. Gestures can be used to revert a private window that was previously moved into a shared virtual environment back to their private virtual environment, thereby ending visibility of the window by others.

In some examples, private windows can be shared using gestures that represent a moving of a private window between levels of accessibility. In some examples, levels of accessibility are visualized for a user as rings that the user can see in their virtual environment. A user can gesture to move a window inward between rings to reduce accessibility by others, or can gesture to move a window outward to increase accessibility by others. An example set of levels includes an unshared level (accessible only to a user), ring 1—a private level (also accessible to user's virtual assistant), ring 2—an intermediate level (accessible to designated users and/or virtual assistants), and ring 3—a fully shared level (accessible to all users and virtual assistants). Starting with a private window near themselves inside the first or closest ring, a user may gesture to move the private window out to the first ring to enable their virtual assistant to access the private window. If a gesture moves the private window further out to the next or second ring, the private window can become accessible by designated users and/or virtual assistants. If a gesture moves the private window still further out to the next or third ring, the private window can become accessible to all users and/or virtual assistants. In a corporate environment, the private level may include a company-wide virtual assistant.

As a specific example, a stock trader could quickly share trading information with fellow stock trader employees with a simple and quick outward gesture applied to a private window that shares the stock trading information with the company-wide virtual assistant. The fellow employees via their access to the company-wide virtual assistant can, thus, get real-time stock trading information. Gestures can likewise be used to move windows to successively narrower share levels.

As another example, when viewing a shared window having information on one or more restaurants, a user may gesture to move the window to their private level. By doing so, their virtual assistant can be triggered to locate the restaurant(s) on a map that includes their current location, to store the restaurants for future consideration, etc. A user may also gesture to move a window from their private level (e.g., their virtual assistant has access to the window) to their unshared level to stop logging content of the window by the virtual assistant.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

FIG. 1 is a block diagram of an example system 100 for creating and interacting with a virtual environment. In general, the system 100 may provide the virtual environment and virtual content for a user to access, view, and interact with using the examples described herein. The system 100 can provide the user with options for accessing the content, applications, virtual objects, and virtual controls using eye gaze and/or movements within the virtual environment. For example, the user may view applications in one or more windows. Some windows may be private in that they contain media, information and/or applications intended for private consumption such as, but not limited to, a video chat, electronic mail (email), and text messaging. Some windows can be shared in that they contain media, information and/or applications intended for public consumption such as, but not limited to, news, movies, music, and TV shows.

As shown in FIG. 1, the example system 100 can include a plurality of computing devices (three examples of which are shown in FIG. 1) that can exchange data over a network 101. The devices may represent clients or servers, and can communicate via network 101, or other network(s). The client devices may include a mobile device (102), a smartphone, a tablet computer, a laptop (104), a notebook, a camera, VR and/or AR glasses, a head-mounted device (HMD) 106, a content system 108, a desktop computer, a personal digital assistant (PDA), a portable media player, an electronic reading device, a gaming device, or any other such computing device that can communicate with other computing devices using the network 101, and that can be used to access, render, provide, or display virtual content. The virtual content can included VR and/or AR content.

Devices 102, 104 and 106 may represent client devices. Mobile device 102, laptop 104, and HMD device 106 can include one or more processors, and one or more memory devices. The devices 102, 104 and 106 can execute a client operating system and one or more client applications that can access, render, provide, or display virtual content on a display device included in or in conjunction with each respective device 102, 104, 106. The content system 108 may represent a server device. In general, content system 108 may include any number of repositories storing content and/or VR/AR software modules (e.g., in the form of VR/AR applications 110) that can generate, modify, or execute VR scenes.

The HMD device 106 may represent a headset, glasses, an eyepiece, or any other wearable device capable of displaying virtual content. In operation, the HMD device 106 can execute a VR/AR application 110 that can play back received, rendered and/or processed images for a user. In some instances, the VR/AR application 110 can be hosted by one or more of the devices 102, 104, 106 or 108.

A movement tracking module 114 can include a six degrees of freedom (6DOF) controller. The 6DOF controller can track and record movements that can be used to classify and identify gestures made by a user. Any number and/or type(s) of method(s) and algorithm(s) may be used to detect the gestures disclosed herein that may be used to change the status of private windows to shared windows. Example gestures include, but are not limited to, a throw, a toss, a flip, a push, a kick, a swipe, etc. The gestures may be carried out using one or more of a limb, a head, a body, a finger, a hand, a foot, etc. The gestures can be qualified by comparing one or more parameters of the gesture, for example, a range of movement, a velocity of movement, acceleration of movement, distance of movement, etc. threshold to ascertain that the gesture signals a change in status of the private window to a shared window.

A gaze tracking module 112 can be used to classify and identify gestures made using eye gaze. Any number and/or type(s) of method(s) and algorithm(s) may be used to detect the gestures disclosed herein that may be used to change the status of private windows to shared windows. Example gaze gestures include, but are not limited to, a side-to-side movement, an up-down movement, a diagonal movement, etc. The gestures can be qualified by comparing one or more parameters of the gesture, for example, a range of movement, a velocity of movement, acceleration of movement, distance of movement, etc. threshold to ascertain that the gesture signals a change in the status of the private window to a shared window.

The gaze tracking module 112 can receive images (e.g., video images) of a user's eye. For example, module 112 can receive or obtain images demonstrating the user's eye movements and gaze direction from an onboard camera in the HMD device 106. The gaze tracking module 112 can analyze the images to generate gaze direction information, which can be used to determine the user's gazing direction. The gaze direction information can be correlated to a scene of images being displayed in HMD device 106, for example. In particular, the module 112 can use the images to determine at what the user was directly looking at when viewing the scene.

The gaze tracking module 112 can use the gaze direction information for identifying a sequence of gaze attention and/or dwell positions and times. The gaze tracking module 112 can determine whether to trigger execution of some predefined target placed within the virtual environment based on the gaze attention and/or dwell positions and times.

Detecting gestures associated with the changing of a status of a private window to shared windows can be performed by a user's virtual system (e.g., a combination of the HMD device 106, the computing device 102 and/or the computing device 104). Additionally or alternatively, gesture detection may be performed by the server 108.

Figure 2:
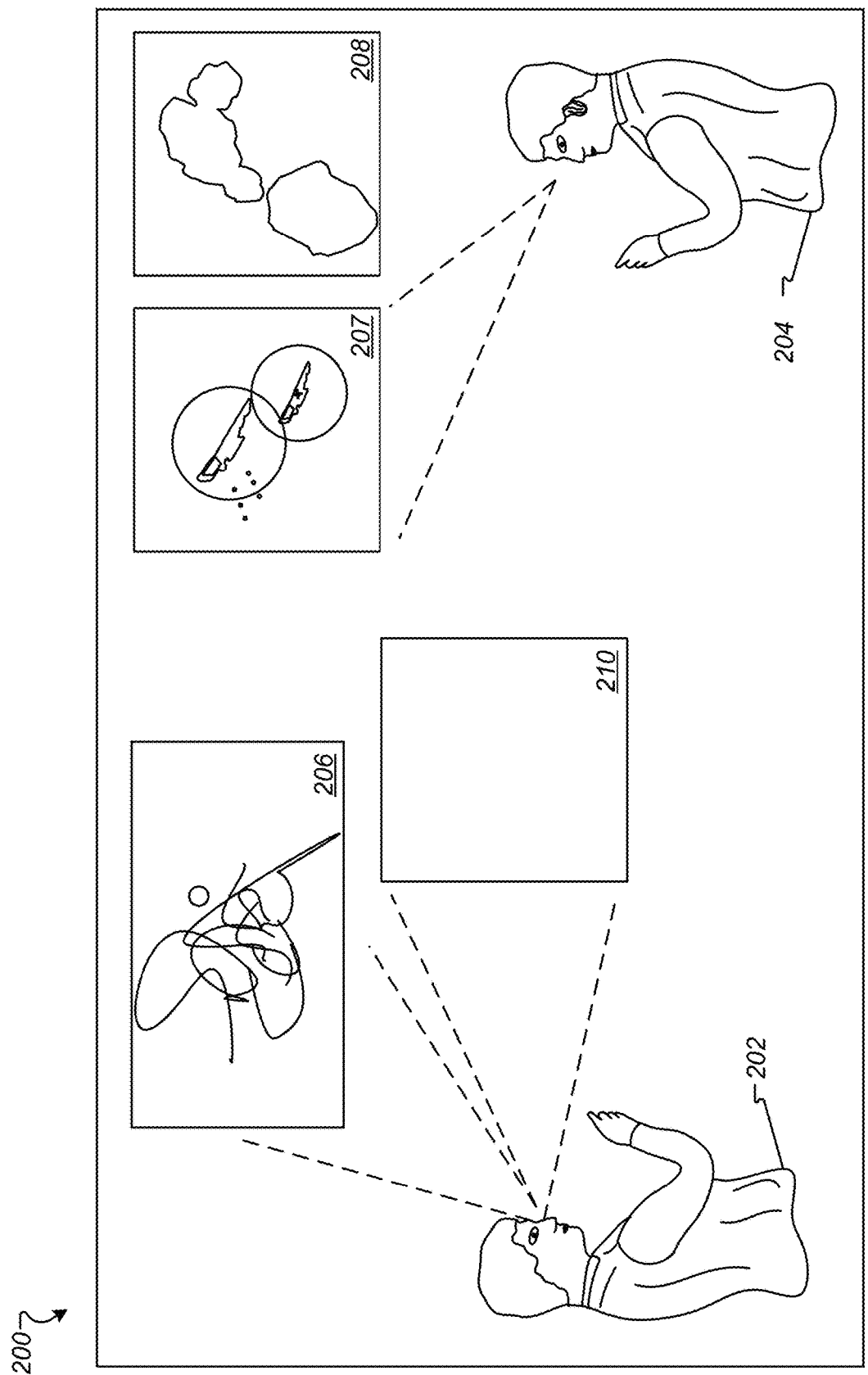
FIG. 2 is a diagram that illustrates an example virtual environment in which two or more users having VR head-mounted display (HMD) devices can share private and shared windows in accordance with this disclosure.

FIG. 2 is a diagram that illustrates an example shared virtual environment 200 in which one or more users (e.g., user 202) can be present and can view content (e.g., 204, 206 and 210 of the shared virtual environment 200) through a respective HMD device 106 (not shown), such as that described above in connection with FIG. 1. From the perspective of other users (e.g., user 204), the user 202 can be rendered in the virtual environment 200 as shown by virtually rendered user 202. For example, the shared virtual environment 200 projects/renders the user 202 into a shared virtual environment 200 and shows the user as user 202. Other renderings are possible. For example, a portion of the user 202, such as hands interacting in the virtual environment, can be rendered rather than the entire user. The image 200 includes a rendering of the upper half of a body simulated from a corner viewing position. Here, the user 202 is shown pointing into the virtual environment, which may indicate the arm position of the user as the user 202 is actually pointing in front of the HMD device 106.

In some implementations, the HMD device 106 can include hardware and software that can recognize, monitor, and/or track 2D or 3D movement of a computing device (e.g., mobile device 102), a controller, or other device renderable in a virtual environment. For example, if the mobile device 102 is placed in front of or held within a range of positions relative to the HMD device 106, mobile device 102 may be rendered in the environment and can function to provide real-time position and orientation data to the VR application 110 so that the VR/AR application 110 can render device 102 in real-time in the virtual environment in the detected position and orientation of the actual device 102.

Another user 204 is rendered in the shared virtual environment 200 together with the user 202, as shown by virtually rendered user 204. The user 204 can be rendered in a similar manner as the user 202.

In the illustrated example, the user 202 and the user 204 are in a simulated art gallery (or any other place), and may be interacting in the virtual environment 200 while they are in the simulated art gallery. The virtual environment 200 shown here includes artwork 206-208 that can be viewed by the user 202 and the user 204 via their HMD device 106.

In addition to viewing the artwork 206-208, the user 202 can view, among other things, a virtual window 210 in which, for example, a user interface associated with a VR/AR application 110 is shown. The virtual window 210 can be private (e.g., only accessible to the user 202), or shared (e.g., accessible to the user 202 and to the user 204). Example VR/AR applications 110 that are often kept private include, but are not limited to, a text messaging application, an email application, a video chat application, etc. A user may desire to change the status of a private window into a shared window. For example, a user may change a video viewing window to shared to share a video with others and/or virtual assistants. As discussed in more detail below, the user 202 of FIG. 2 can use a physical gesture and/or an eye gaze gesture to trigger the transition of the virtual window 210 to a shared window.

Figure 3A:
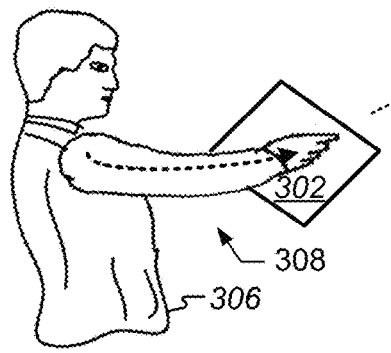
FIG. 3A illustrates an example gesture that may be used to share a private window in a virtual environment in accordance with this disclosure.
Figure 4A:
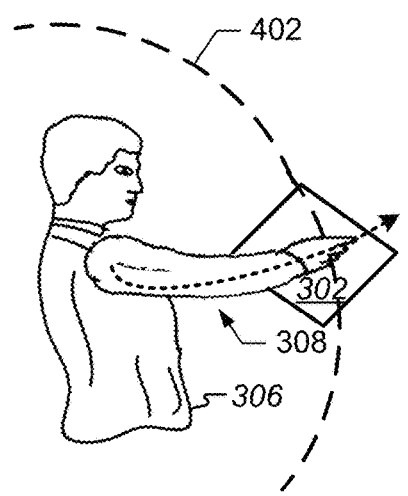
FIG. 4A illustrates an example gesture that may be used to share a private window in a virtual environment in accordance with this disclosure.
Figure 4B:
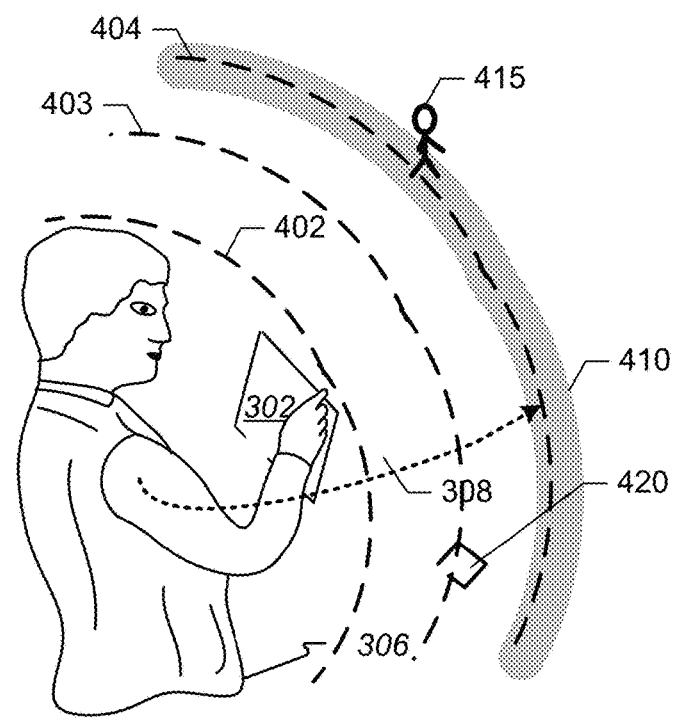
FIG. 4B illustrates an example gesture that may be used to share a private window in a virtual environment in accordance with this disclosure.
Figure 5:
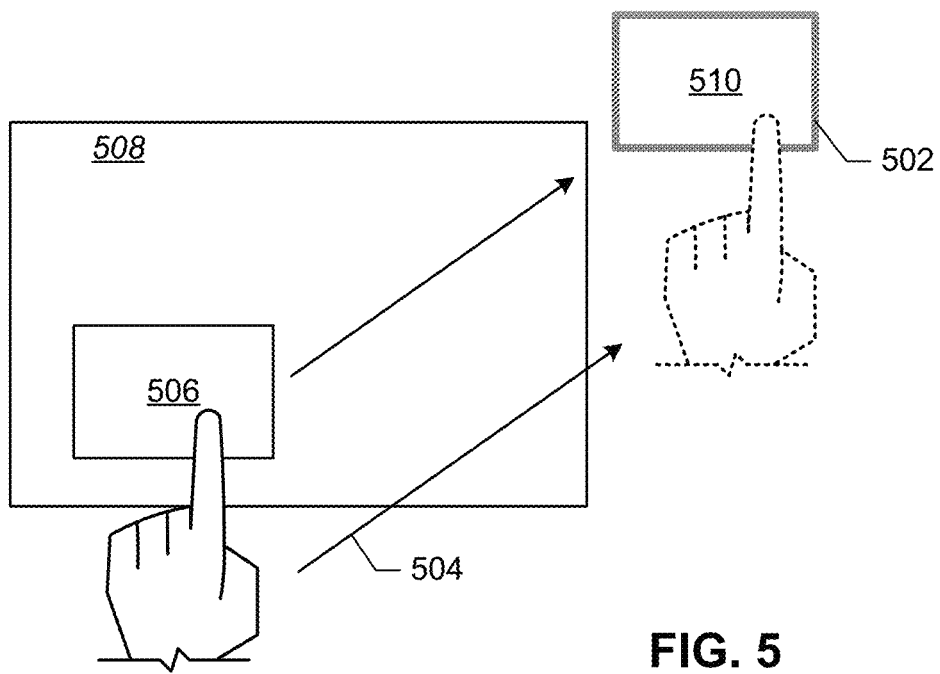
FIG. 5 illustrates an example gesture that may be used to share a private window in a virtual environment in accordance with this disclosure.
Figure 6A:
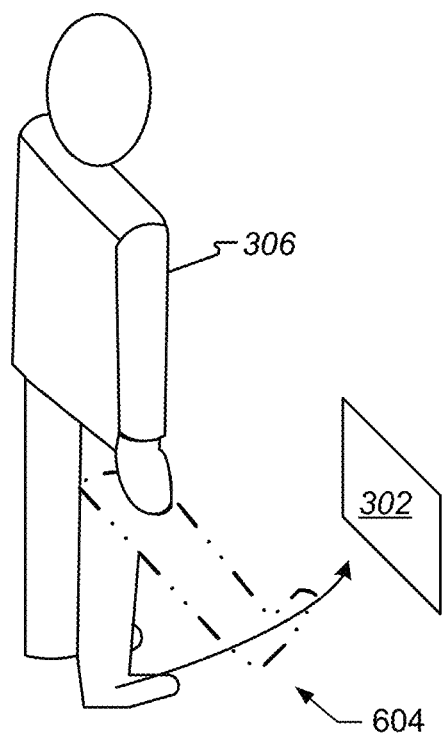
FIG. 6A illustrates an example gesture that may be used to share a private window in a virtual environment in accordance with this disclosure.

In the following examples, various example gestures that may be used to trigger the change of status of a private window (or components thereof) into a shared window are shown. For instance, FIG. 3A shows an example outward pushing gesture; FIG. 4A shows an example outward pushing gesture qualified by a distance; FIG. 4B shows an example outward pushing gesture between rings or levels; FIG. 5 is an example swiping gesture applied to a window element; and FIG. 6A is an example kicking gesture. In following examples, various methods of sharing windows are shown in connection with example gestures. However, gestures and window sharing may be combined in any of a variety of ways.

Figure 3B:
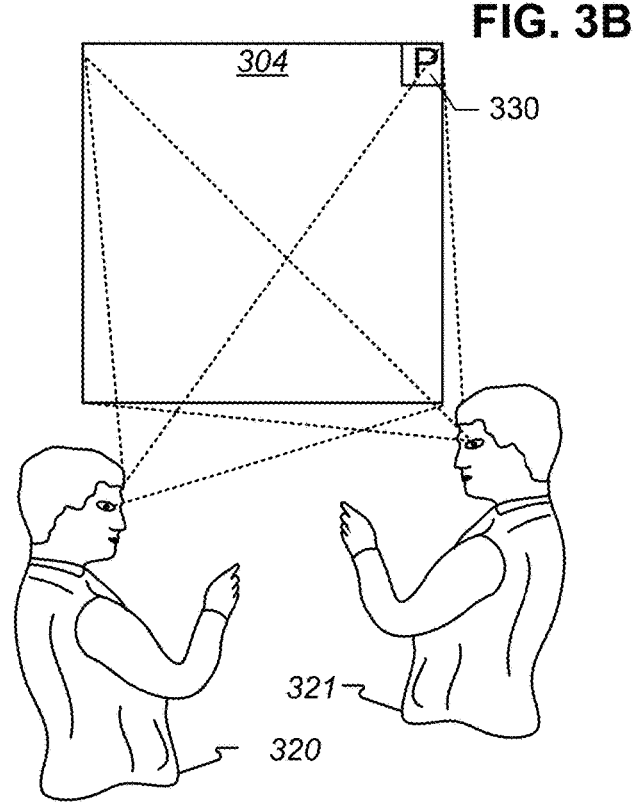
FIG. 3B illustrates an example sharing of a window by two users in a virtual environment in accordance with this disclosure.

FIG. 3A illustrates an example gesture that may be used to trigger the change of status of a private window 302 into a shared window 304, e.g., as shown in FIG. 3B. In FIG. 3A, a user 306 associated with the private window 302 performs an outward pushing gesture 308 of the private window 302. Any number and/or type(s) of other gestures or variants thereof may also be used. For instance, the user 306 may grasp the window 302 during the gesture, place their hand on the window 302 during the gesture, hover their hand above the window 302 during the gesture, etc. Motion of the window 302 may continue after the gesture 308 in, for example, a floating manner.

Turning to FIG. 3B, once the private window 302 becomes the shared window 304, the shared window 304 becomes accessible to other users 320 and 321 and/or virtual assistants. Depending on, for example, personal preference, other private windows of the user 306 can remain private even though the window 302 is changed to the shared window 304. However, a user may gesture that all of their private windows should be made shared.

In some examples, a shared window contains an element, feature or designation that indicates that the shared window was formed by changing a private window to the shared window. For instance, in FIG. 3B the shared window 304 contains a "P" 330 in the upper-right corner is used; in FIG. 5 a border color 502 is changed, in FIG. 6 a background texture or shading 602 is changed. Any other means of identifying a status of windows may be used. As shown, the size or shape of a window 302 can change as the window 302 is changed status to private window 304. Elements of the private window 302 and shared window 304 may differ in number and/or type.

In some instances, a user 306 needs to push the window 302 to particular distances to trigger changing of a private window to a shared window. For example, in FIG. 4A, the private window 302 has be pushed beyond a pre-determined distance 402 (see FIG. 4A) to trigger changing of the window 302 to the shared window 304. The distance 402 can represent a private or unshared space boundary, e.g., arms reach. Such a boundary 402 could be satisfied with the original gesture 308 or continued motion of the window 302.

In an example shown in FIG. 4B, there are multiple distances 402, 403, 404, etc. corresponding to different rings, levels, groups, etc. of sharing. In some examples, as the gesture 308 extends out to increasing distances 402-404, the private window 302 becomes additionally shared. For example, at the distance 402, the private window 302 may be shared with a first set of users and/or virtual assistants and, at the distance 403, the private window 302 may be shared with a second set of users and/or virtual assistants that includes the first set. Thus, by extending the gesture 308, the private window 302 may be additionally shared, e.g., shared with additional users and/or virtual assistants. In other examples, the second set may include some of or none of the first set. Thus, by extending the gesture 308 to different distances 402-404, the private window 302 may be shared with different sets of people and/or virtual assistants. In some examples, the distances 402-404 are visualized for the user 306 as virtual rings (part of one of which is designated at reference numeral 410) that they perceive as extending around or from them. In some examples, who has access to a window 302 at a particular ring are visually indicated. For example, users and/or virtual assistant can be indicated using icons 415. An icon 415 can represent a user, a virtual assistant, and/or a collection or group thereof. In some examples, indicators (e.g., thumbnails, one of which is designated at reference numeral 420) are shown together with or on the rings 410 to depict how private windows 302 are shared. In some examples, an AR/VR application 110 can be displayed in a window to enable a user to define the users and/or virtual assistants associated with each ring 402-404. In some examples, as a gesture moves successively outward from a user, rings are cumulatively selected. In some examples, rings can be selected independently using multiple gestures. In some examples, a ring also shares the private window with all those associated with rings closer to the user.

As shown in FIG. 5, another example gesture in the form of a swiping gesture 504 of an element 506 of a private window 508 across the private window 508 is used to signal that the element 506 be made into a shared element 510. The shared element 510 may be implemented as a separate window, or may be incorporated by another into one of their windows.

Figure 6B:
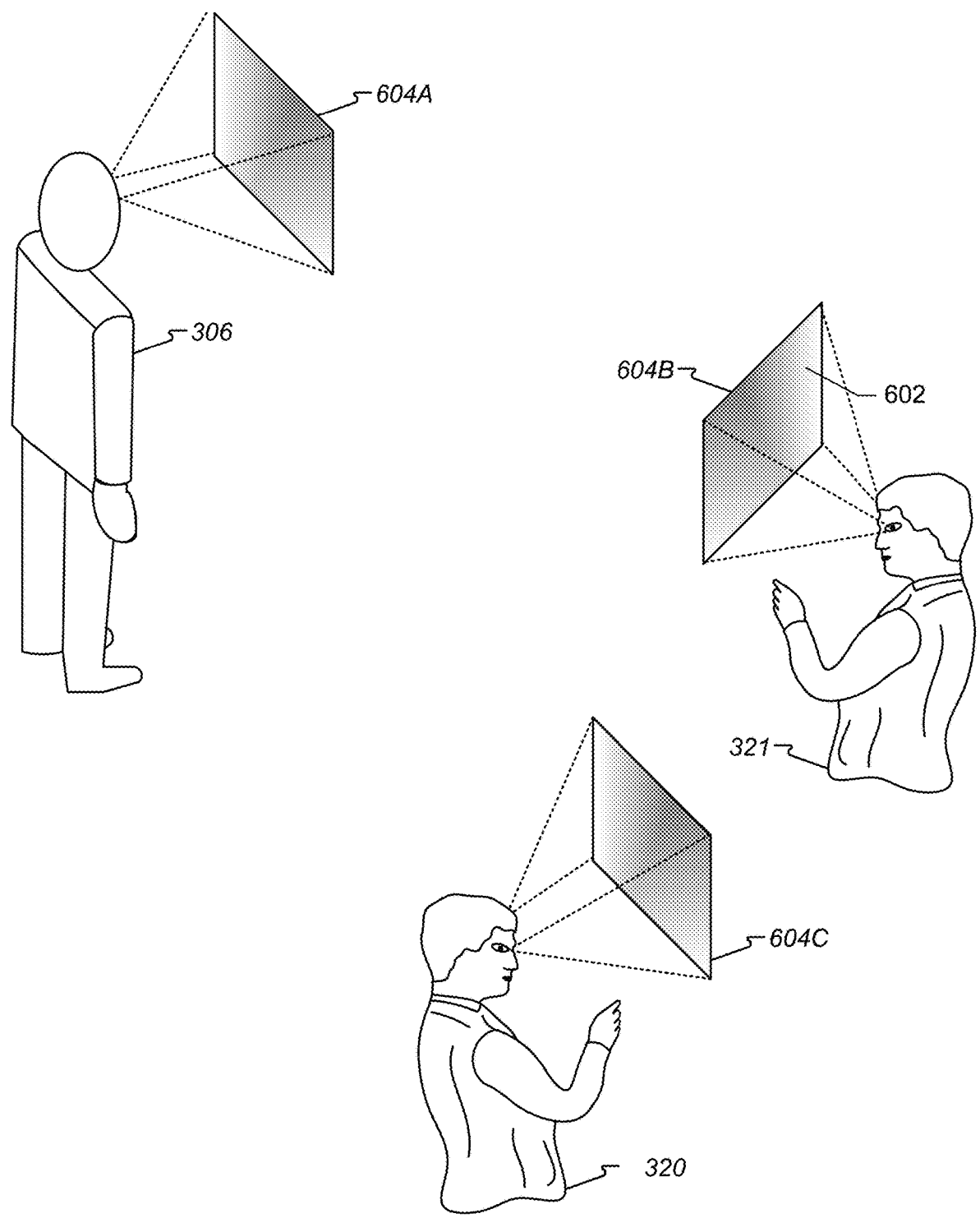
FIG. 6B illustrates an example sharing of a private window as multiple instances of the private window in a virtual environment in accordance with this disclosure.

In the example of FIG. 6A, the user 306 performs another gesture in the form of a kicking gesture 604 to the private window 302. Regardless of the gesture of FIG. 6A, the private window 302 can be changed to multiple shared window instances 604A-C, as shown in FIG. 6B. Multiple instances may be used to allow others who are not in the same location within a virtual environment to access the same shared window.

Figure 7:
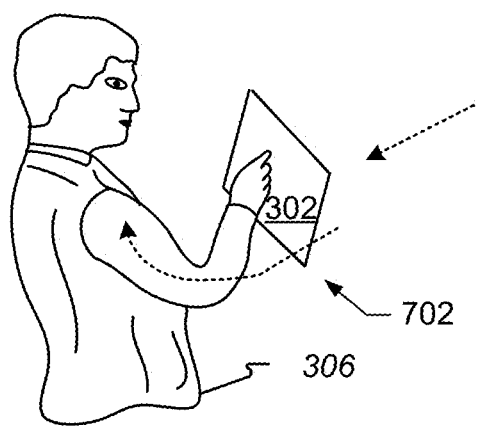
FIG. 7 illustrates an example gesture to end the sharing of a private window in a virtual environment in accordance with this disclosure.

FIG. 7 shows an example gesture (e.g., a grabbing gesture 702) that the user 306 can perform to move the shared window 304 (see FIG. 3B) back to the private window 302. In some examples, the sharing level (or status) of the private window 302 can be increased and decreased automatically as other users come closer to or move away from the user 306 in a virtual environment. For instance, rings similar in nature to those of FIG. 4B may be used, but with distances from the user to the rings instead being associated with physical or virtual separation distance from the user to others rather than the movement length of a gesture. For example, as a user with a more intimate relationship gets close (e.g., for a hug) private windows may be automatically shared with them.

While various example gestures have been described herein in connection with the drawings, it is contemplated that many other gestures and/or qualifications thereof may be used to signal and/or identify intent to change a private window into a shared window. In some examples, a velocity, acceleration, a range of motion, etc. may be used to qualify a gesture as a signal on the part of a user before a private window is shared. For instance, a gesture may have to occur with a sufficient velocity or range of motion to cause a private window to be shared. The user's signal can be confirmed by, for example, presenting them with a popup dialog that requires they choose "yes" or "no."

In some examples, when a private window is changed to a shared window via a gesture, VR/AR application identifier (ID) and Metadata are published and/or made accessible to the other user via their virtual system to allow their HMD 106 to display the shared window in their HMD 106. In some examples, a user can control, identify or restrict who can access a shared window. For example, a shared window may be shared only with friends and family.

When media such as a movie is shared by changing a private window to a shared windows, regional content restrictions may be applied that block some users from viewing the movie. Moreover, a user may be required to pay before viewing shared media. For instance, if a pay-per-view movie is shared, other users can be directed to a server to pay for the movie before they are able to view the movie.

Figure 8:
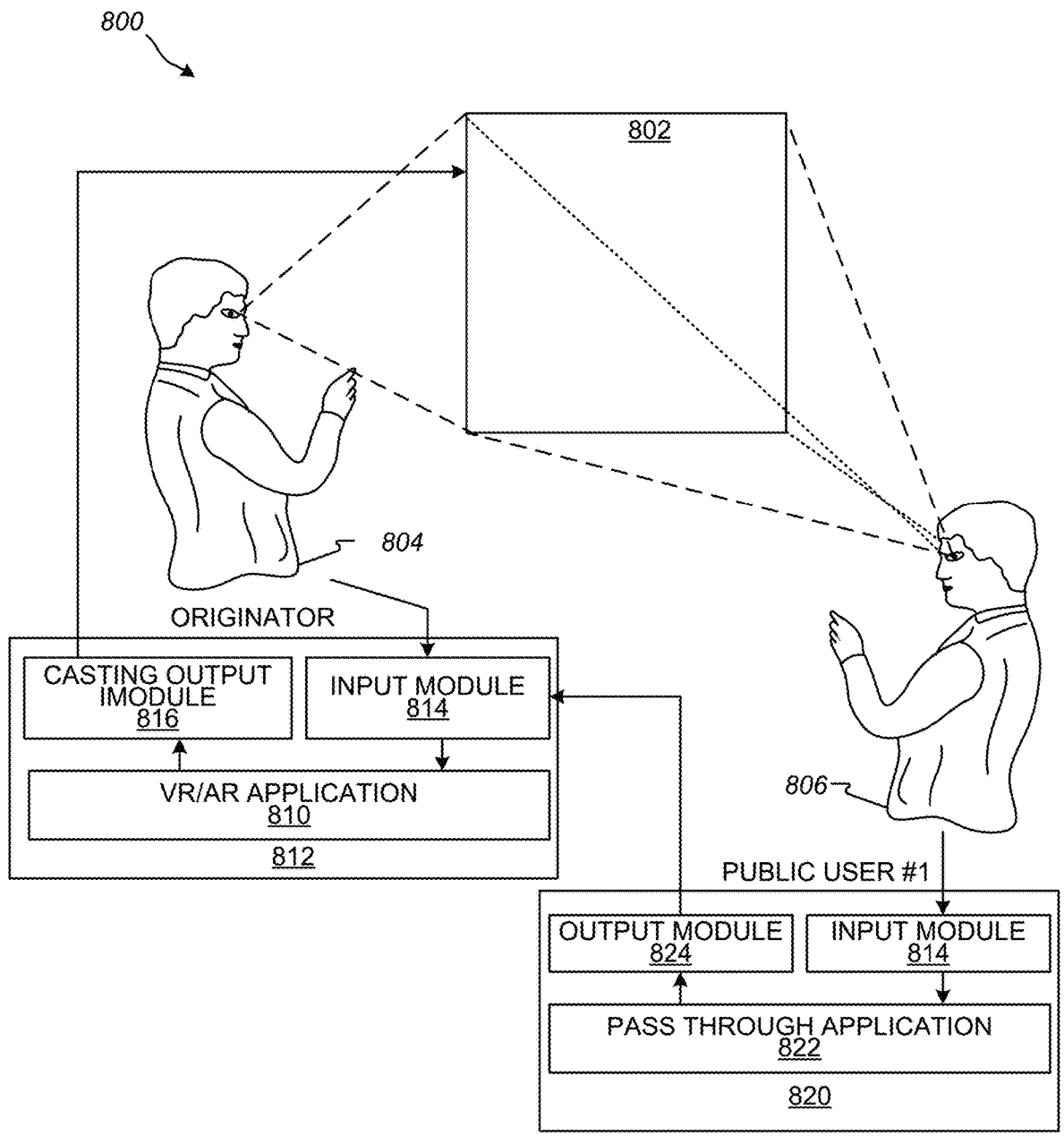
FIGS. 8 and 9 are block diagrams of example systems for sharing windows in virtual environments in accordance with this disclosure.

FIG. 8 illustrates an example system 800 for sharing a shared window 802 by two or more users 804 and 806. In the example of FIG. 8, the user 804 previously performed a gesture to trigger change of a private window (not shown) to the shared window 802. Thus, user 804 is the originator of the shared window 802, and user 806 is a user to whom the shared window 802 has been shared.

Rendering for a VR/AR application 810 of the window 802 can continue to execute on the originator's virtual system 812. Inputs from the user 804 are received by the VR/AR application 810 via an input module 814, and outputs of the VR/AR application 810 are sent to the shared window(s) 802 via a casting output module 816.

On a virtual system 820 associated with the user 806, inputs from the user 806 are received via input module 814, and are forwarded to the system 812 by a pass through application 822 via an output module 824.

Execution of the VR/AR application 810 and rendering for the window 802 could be performed by a server such as the server 108. In such circumstances, system 812 would operate similarly to system 820, with both systems forwarding their inputs to the server 108.

Figure 9:
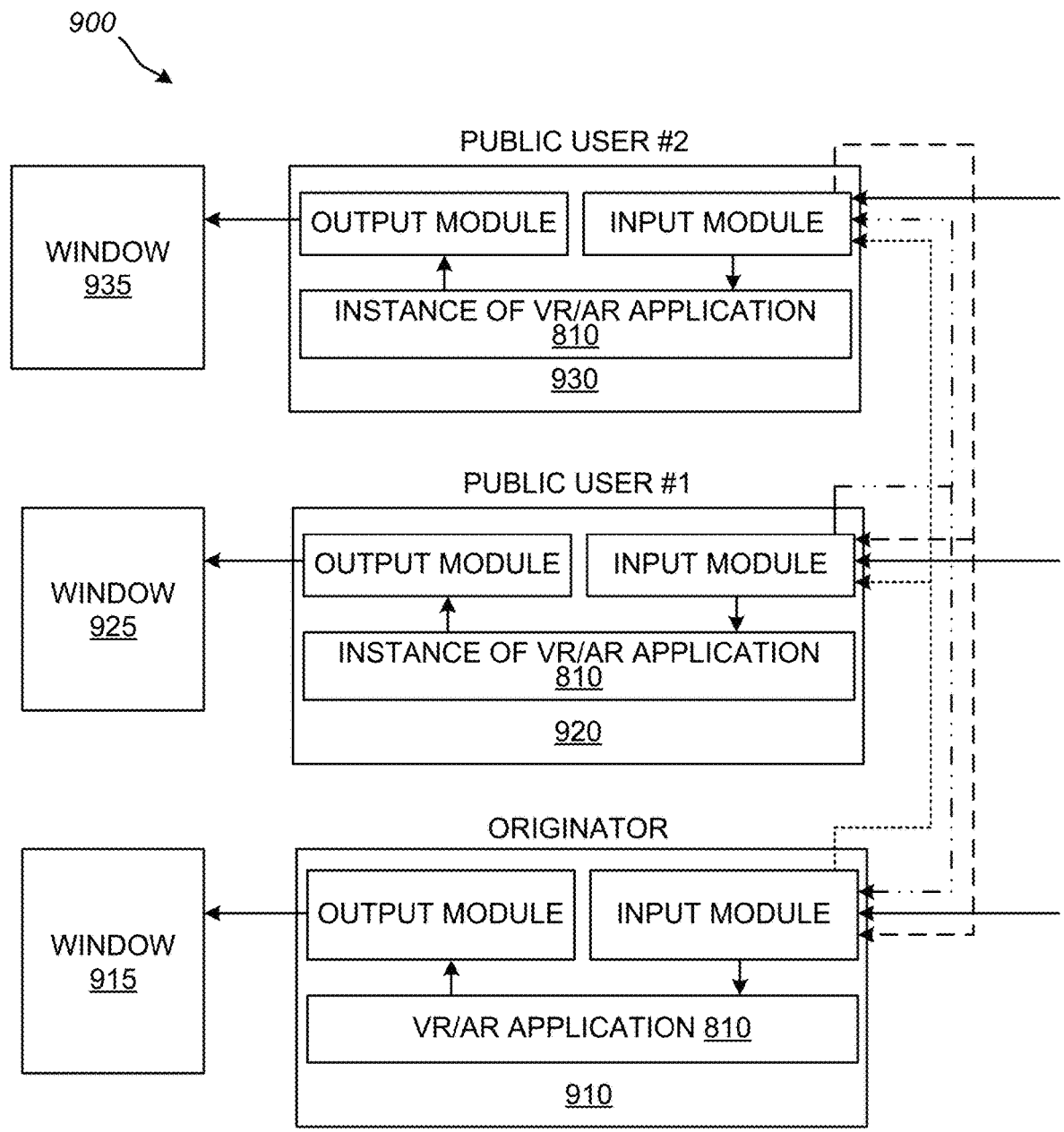

FIG. 9 illustrates an example system 900 for sharing a shared window by three or more users. In FIG. 9, their associated virtual systems 910, 920, 930 each separately execute the VR/AR application 810 and perform rendering for their respective instance 915, 925 and 935 of the shared window. To keep the shared window instances 915, 925 and 935 in sync, the systems 910, 920 and 930 provide all of their inputs to each of the other systems 910, 920 and 930.

Figure 10:
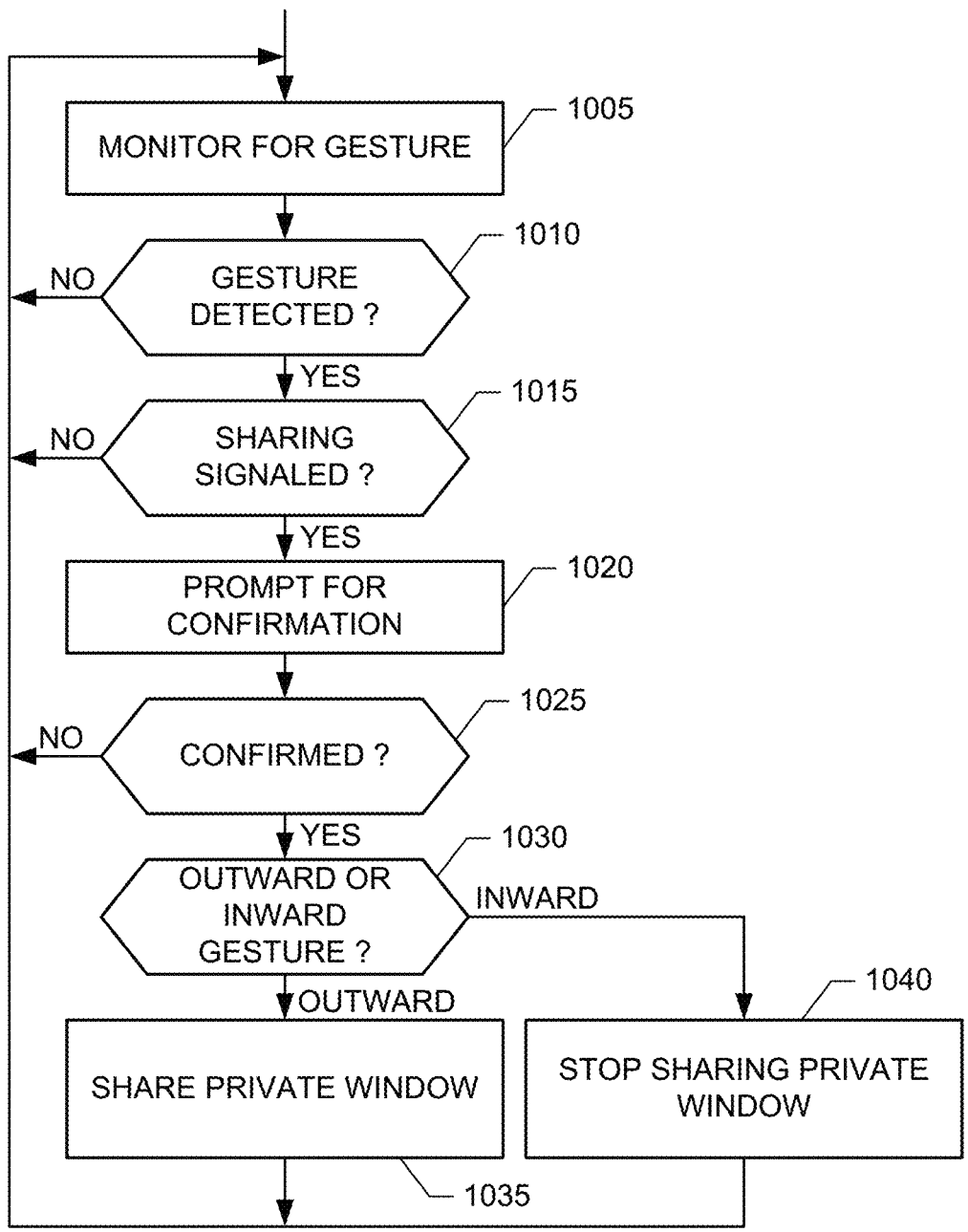
FIG. 10 is a flowchart representing an example method that may be used to carry out the examples disclosed herein.
Figure 11:
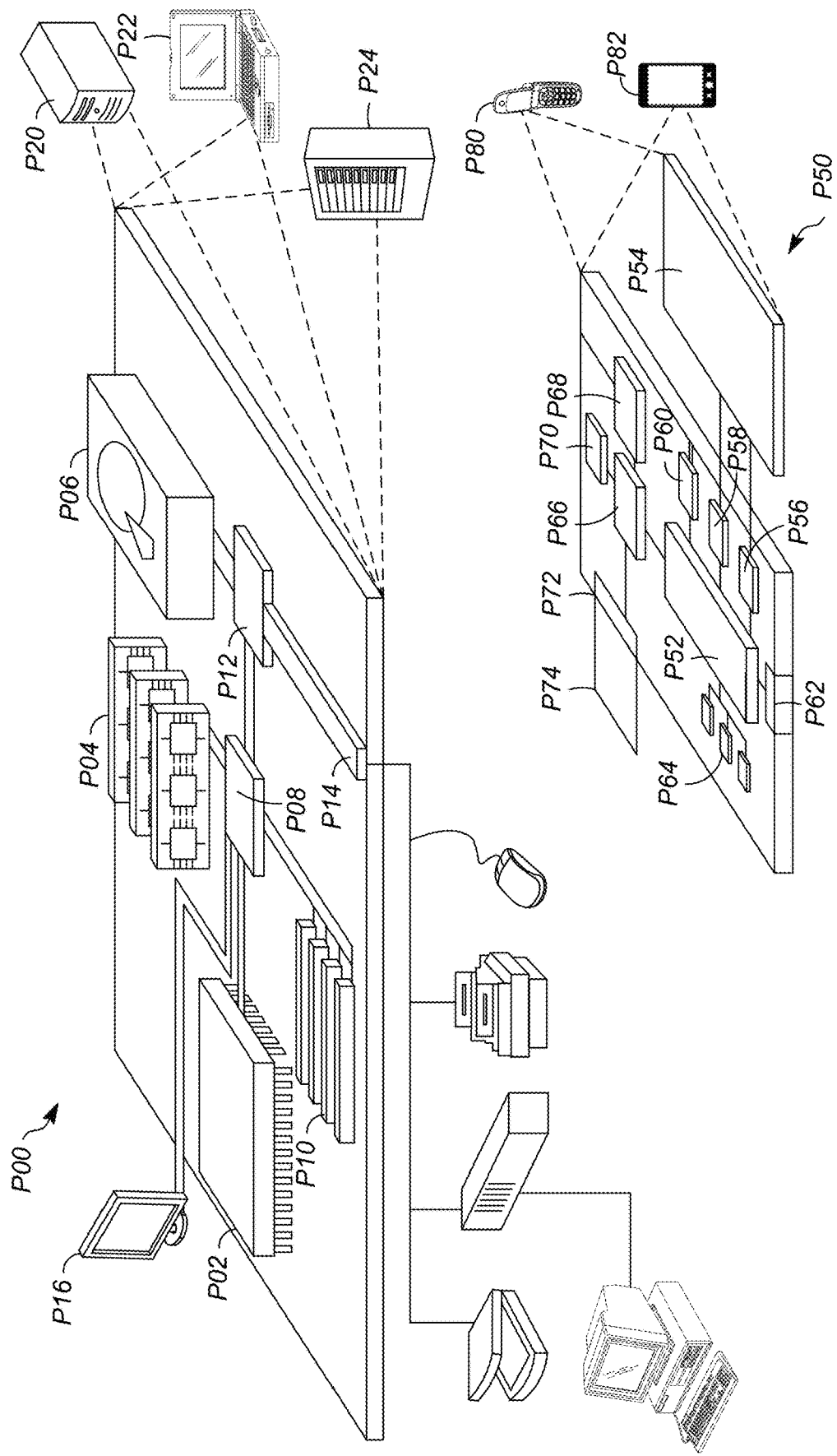
FIG. 11 is a block diagram of an example computer device and an example mobile computer device, which may be used to implement the examples disclosed herein.

FIG. 10 is a flowchart of an example process or method that may, for example, be implemented by a virtual system and/or as machine-readable instructions carried out by one or more processors, such as the example processors P00 and P50 of FIG. 11, to implement the example systems disclosed herein. The example machine-readable instructions of FIG. 10 begin with an HMD 106, a device 102 or a device 104 associated with the HMD 106 monitoring for a gesture (block 1005). If a gesture is detected (block 1010), the detected gesture (e.g., using a movement range, speed, velocity, etc.) to determine whether it is likely the user is signaling to share a private window (block 1015). Otherwise (block 1010), control returns to block 1005 to continue monitoring for gestures.

If it is likely the window is to be shared (block 1015), the user is prompted for confirmation (block 1020). If confirmation is received (block 1025) and the gesture is an outward gesture (block 1030), the private window associated with the gesture is shared (block 1035), and control returns to block 1005 to continue monitoring for gestures.

Returning to block 1025, if confirmation is received (block 1025) and the gesture is an inward gesture (block 1030), the shared window associated with the gesture is reverted to a private window (block 1040), and control returns to block 1005 to continue monitoring for gestures.

Returning to block 1025, if confirmation is not received (block 1025), control returns to block 1005 to continue monitoring for gestures.

One or more of the elements and interfaces disclosed herein may be combined, divided, re-arranged, omitted, eliminated and/or implemented in any other way. Further, any of the disclosed elements and interfaces may be implemented by the example processor platforms P00 and P50 of FIG. 11, and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. Any of the elements and interfaces disclosed herein may, for example, be implemented as machine-readable instructions carried out by one or more processors. A processor, a controller and/or any other suitable processing device such as those shown in FIG. 11 may be used, configured and/or programmed to execute and/or carry out the examples disclosed herein. For example, any of these interfaces and elements may be embodied in program code and/or machine-readable instructions stored on a tangible and/or non-transitory computer-readable medium accessible by a processor, a computer and/or other machine having a processor, such as that discussed below in connection with FIG. 11. Machine-readable instructions comprise, for example, instructions that cause a processor, a computer and/or a machine having a processor to perform one or more particular processes. The order of execution of methods may be changed, and/or one or more of the blocks and/or interactions described may be changed, eliminated, sub-divided, or combined. Additionally, they may be carried out sequentially and/or carried out in parallel by, for example, separate processing threads, processors, devices, discrete logic, circuits, etc.

As used herein, the term "computer-readable medium" is expressly defined to include any type of computer-readable medium and to expressly exclude propagating signals. Example computer-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, in some examples, the mobile device 102 can be placed, located or otherwise implemented in conjunction within the HMD device 106. The mobile device 102 can include a display device that can be used as the screen for the HMD device 106. The mobile device 102 can include hardware and/or software for executing the VR/AR application 110.

In the example system 100, the content system 108 can include VR/AR applications 110. The VR/AR applications 110 can be configured to execute on any or all of devices 102, 104, 106 and 108. The HMD device 106 can be connected to device 102 or 104 to access virtual content on content system 108, for example. Device 102 or 104 can be connected (wired or wirelessly) to HMD device 106 to provide virtual content for display. A user's virtual system can be the HMD device 106 alone, or a combination of the HMD 106 and a device 102 or a device 104 associated with the HMD device 106. The use of virtual in virtual system represents that the system provides virtual content and/or a virtual environment, not that the system itself is virtual. However, a virtual system may include geographically dispersed devices that are communicatively coupled.

In some implementations, one or more content servers (e.g., content system 108) and one or more computer-readable storage devices can communicate with the computing devices 102, 104, 106 using network 101 to provide virtual content to the devices 102, 104 and 106.

In some implementations, the mobile device 102 can execute the VR/AR application 110 and provide the content for the virtual environment. In some implementations, the laptop computing device 104 can execute the VR/AR application 110 and can provide content from one or more content servers (e.g., content server 108). The one or more content servers and one or more computer-readable storage devices can communicate with the mobile device 102 and/or laptop computing device 104 using the network 101 to provide content for display in the HMD device 106.

The content server 108 can include a gaze tracking module 112 and/or a movement tracking module 114. In a non-limiting example, a user (not shown) can access virtual content in a virtual environment using the mobile device 102 connected to the HMD device 106. While in the virtual environment, the user can move around and look around. The system 100 can track eye gaze (e.g., using gaze tracking module 112) and can track movement (e.g., using movement tracking module 114). Movement may indicate how the user is moving his or her body (or device representing a body part) within the virtual environment. Eye gaze may indicate what the user is looking at in the virtual environment.

The gaze tracking module 112 can interface with one or more sensors, computing systems, cameras, and/or controls to detect gaze/eye movement associated with the user. The one or more sensors, computing systems, cameras, and/or controls may be housed in the HMD device 106, for example. The gaze tracking module 112 can be configured to track or monitor the direction of a user's eye gaze (i.e., tracking or monitoring where/which direction the user is looking), and changes in user's eye gaze (e.g., a side-to-side movement). In general, gaze tracking performed by gaze tracking module 112 may include tracking the orientation, location and movement of one eye or both eyes with respect to a defined coordinate system.

In the event that HMD device 106 is wirelessly coupled to device 102 or device 104, the coupling may include use of any wireless communication protocol. A non-exhaustive list of wireless communication protocols that may be used individually or in combination includes, but is not limited to, the Institute of Electrical and Electronics Engineers (IEEE®) family of 802.x standards a.k.a. Wi-Fi® or wireless local area network (WLAN), Bluetooth®, Transmission Control Protocol/Internet Protocol (TCP/IP), a satellite data network, a cellular data network, a Wi-Fi hotspot, the Internet, and a wireless wide area network (WWAN).

In the event that the HMD device 106 is electrically coupled to device 102 or 104, a cable with an appropriate connector on either end for plugging into device 102 or 104 can be used. A non-exhaustive list of wired communication protocols that may be used individually or in combination includes, but is not limited to, IEEE 802.3x (Ethernet), a powerline network, the Internet, a coaxial cable data network, a fiber optic data network, a broadband or a dialup modem over a telephone network, a private communications network (e.g., a private local area network (LAN), a leased line, etc.).

A cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the electrical coupling can include a cable with an appropriate connector on either end for plugging into the HMD device 106 and device 102 or device 104. For example, the cable can include a USB connector on both ends. The USB connectors can be the same USB type connector or the USB connectors can each be a different type of USB connector. Either end of a cable used to couple device 102 or 104 to HMD 106 may be fixedly connected to device 102 or 104 and/or HMD 106.

Implementations can include one or more of the following, in whole, in part, alone and/or in any combinations with each order. For example, one or more of:

Example 1

A method comprising:
detecting a gesture of a user in a virtual environment associated with a private window in the virtual environment, the private window associated with the user;
determining whether the gesture represents a signal to share the private window with another; and
when the gesture represents a signal to share the private window, changing the status of the private window to a shared window.

Example 2

The method of claim 1, further comprising:
detecting a second gesture of the user;
determining whether the second gesture represents a second signal to additionally share the private window; and
when the second gesture represents the second signal to additionally share the private window, additionally sharing the private window with still another.

Example 3

The method of claim 2, wherein the gesture is associated with a first distance from the user, wherein the second gesture is associated with a second distance greater than the first distance, and wherein the second gesture shares the private window with at least one other than the gesture.

Example 4

The method of claim 3, further comprising displaying at the second distance an indication representing who have access to the shared window for the second gesture.

Example 5

The method of claims 1 to 4, wherein sharing the private window comprises:
creating a shared instance of the private window accessible to others,
wherein the private window remains accessible to the first person.

Example 6

The method of claims 1 to 5, further comprising:
receiving a first input to the shared window from the user;
receiving a second input to the shared window from another;
rendering the shared window based on the first and second input; and
providing the rendering to the shared window.

Example 7

The method of claims 1 to 6, further comprising:
receiving a first input to the shared window from the user;
receiving a second input to the shared window from another;
rendering an instance of the shared window based on the first input and the second input; and
providing the rendering to the instance of the shared window.

Example 8

The method of claims 1 to 7, wherein determining whether the gesture represents a signal to share the private windows comprises detecting at least one of a throw, a toss, a flip, a push, a kick, and/or a swipe.

Example 9

The method of claim 8, wherein the gesture is performed using at least one of a hand, a finger, a foot, a limb, a head, a trunk of the body, and/or an eye gaze.

Example 10

The method of claim 8 or 9, wherein determining whether the gesture represents a signal to share the private window further comprises determining at least one of a velocity, acceleration, and/or a range of motion satisfying a respective threshold.

Example 11

The method of claim 10, wherein changing the window to a shared window comprises modifying the shared window to indicate the shared window is a shared private window.

Example 12

The method of claims 1 to 11, wherein detecting the gesture comprises receiving an input from a six degrees of freedom controller.

Example 13

An apparatus comprising:
a tracking module configured to detect a gesture of a user in a virtual environment associated with a private window in the virtual environment, the private window associated with the us;
a processor; and
a memory storing machine-readable instructions that, when executed by the processor, cause the processor to:
  determine whether the gesture represents a signal to share the private window with another; and
  when the gesture represents a signal to share the private window, change the status of the private window to a shared window.

Example 14

The apparatus of claim 13, wherein the processor:
detects a second gesture of the first person;
determines whether the second gesture represents a second signal to additionally share the private window; and
when the second gesture represents the second signal to additionally share the private window, additionally shares the private window with still another.

Example 15

The apparatus of claim 14, wherein the gesture is associated with a first distance from the user, wherein the second gesture is associated with a second distance greater than the first distance, and wherein the second gesture shares the private window with at least one other than the gesture.

Example 16

The apparatus of claims 13 to 15, wherein the processor changes the private window to a shared window by:
creating a shared instance of the private window accessible to others,
wherein the private window remains accessible to the first person.

Example 17

The apparatus of claims 13 to 16, further comprising:
a first input module configured to receive a first input to the shared window from the user;
a second input module configured to receive a second input to the shared window from another;
a virtual reality application and/or an augmented reality application configured to render the shared window based on the first and second input; and
an output module configured to provide the rendering to the shared window.

Example 18

The apparatus of claims 13 to 17, further comprising:
a first input module configured to receive a first input to the shared window from the user;
a second input module configured to receive a second input to the shared window from another;
a virtual reality application and/or an augmented reality application configured to render an instance of the shared window based on the first input and the second input; and
an output module configured to provide the rendering to the shared window.

Example 19

The apparatus of claims 13 to 18, wherein the apparatus comprises at least one of a head mounted display for use with the virtual environment, or a computing device configured to provide virtual content to the head mounted display.

Example 20

A non-transitory machine-readable media storing machine-readable instructions that, when executed, cause a machine to:
detect a gesture of a user in a virtual environment associated with a private window in the virtual environment, the private window associated with the user;
determine whether the gesture represents a signal to share the private window with another; and
when the gesture represents a signal to share the private window, change the status of the private window to a shared window.

FIG. 11 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of person interfaces, applications run by device P50, and wireless communication by device P50.

Processor P52 may communicate with a person through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a person. The control interface P58 may receive commands from a person and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on the processor P52, that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a person and convert it to usable digital information. Audio codec P60 may likewise generate audible sound for a person, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
    detecting a gesture of a user in a virtual environment associated with a private window in the virtual environment, the private window associated with the user;
    moving the private window from a first position closer to the user at a first level of accessibility displayed within the virtual environment to a second position farther from the user at a second level of accessibility displayed within the virtual environment to provide different levels of accessibility;
    determining whether the gesture represents a signal to share the private window with another user; and
    when the gesture represents a signal to share the private window, changing the status of the private window to a shared window.

2. The method of claim 1, further comprising:
    detecting a second gesture of the user;
    determining whether the second gesture represents a second signal to additionally share the private window; and when the second gesture represents the second signal to additionally share the private window, additionally sharing the private window with another user.

3. The method of claim 2, wherein the gesture is associated with a first distance from the user, wherein the second gesture is associated with a second distance greater than the first distance, and wherein the second gesture shares the private window with at least one other user.

4. The method of claim 3, further comprising displaying at the second distance an indication representing which user has access to the shared window for the second gesture.

5. The method of claim 1, wherein sharing the private window comprises:
creating a shared instance of the private window accessible to other users,
wherein the private window remains accessible to the user.

6. The method of claim 1, further comprising:
receiving a first input to the shared window from the user;
receiving a second input to the shared window from another user;
rendering the shared window based on the first and second input; and
providing the rendering to the shared window.

7. The method of claim 1, further comprising:
receiving a first input to the shared window from the user;
receiving a second input to the shared window from another user;
rendering an instance of the shared window based on the first input and the second input; and
providing the rendering to the instance of the shared window.

8. The method of claim 1, wherein determining whether the gesture represents a signal to share the private windows comprises detecting at least one of a throw, a toss, a flip, a push, a kick, and/or a swipe.

9. The method of claim 8, wherein the gesture is performed using at least one of a hand, a finger, a foot, a limb, a head, a trunk of the body, and/or an eye gaze.

10. The method of claim 8, wherein determining whether the gesture represents a signal to share the private window further comprises determining at least one of a velocity, acceleration, and/or a range of motion satisfying a respective threshold.

11. The method of claim 1, wherein changing the window to a shared window comprises modifying the shared window to indicate the shared window is a shared private window.

12. The method of claim 1, wherein detecting the gesture comprises receiving an input from a six degrees of freedom controller.

13. The method of claim 1, wherein the virtual environment is one of a virtual reality environment/or an augmented reality environment.

14. An apparatus comprising:
a tracking module configured to detect a gesture of a user in a three-dimensional (3D) virtual environment associated with a private window in the 3D virtual environment, the detected gesture being a distance of movement of the private window to provide different levels of accessibility, at least one level of accessibility being displayed for the user in the 3D virtual environment, the private window associated with the user;
a processor; and
a memory storing machine-readable instructions that, when executed by the processor, cause the processor to:
determine whether the gesture represents a signal to share the private window with another user; and
when the gesture represents a signal to share the private window, change the status of the private window to a shared window.

15. The apparatus of claim 14, wherein the processor:
detects a second gesture of the user;
determines whether the second gesture represents a second signal to additionally share the private window; and
when the second gesture represents the second signal to additionally share the private window, additionally shares the private window with still another user.

16. The apparatus of claim 15, wherein the gesture is associated with a first distance from the user, wherein the second gesture is associated with a second distance greater than the first distance, and wherein the second gesture shares the private window with at least one other user.

17. The apparatus of claim 14, wherein the processor changes the private window to a shared window by:
creating a shared instance of the private window accessible to other users,
wherein the private window remains accessible to the user.

18. The apparatus of claim 14, further comprising:
a first input module configured to receive a first input to the shared window from the user;
a second input module configured to receive a second input to the shared window from another user;
a virtual reality application and/or an augmented reality application configured to render the shared window based on the first and second input; and
an output module configured to provide the rendering to the shared window.

19. The apparatus of claim 14, further comprising:
a first input module configured to receive a first input to the shared window from the user;
a second input module configured to receive a second input to the shared window from another user;
a virtual reality application and/or an augmented reality application configured to render an instance of the shared window based on the first input and the second input; and
an output module configured to provide the rendering to the shared window.

20. The apparatus of claim 14, wherein the apparatus comprises at least one of a head mounted display for use with the virtual environment, or a computing device configured to provide virtual content to the head mounted display.

21. The method of claim 14, wherein the virtual environment is one of a virtual reality environment or an augmented reality environment.

22. A non-transitory machine-readable media storing machine-readable instructions that, when executed, cause a machine to:
generate a three-dimensional (3D) virtual environment;
detect a gesture of a user in the three-dimensional (3D) virtual environment associated with a private window in the virtual environment, the private window associated with the user;
determine whether the gesture represents a signal to share the private window with another user, the gesture includes moving the private window between a first distance associated with a first level of accessibility and a second distance associated with a second level of accessibility, the second distance being different than the first distance, the first level of accessibility having a first ring and the second level of accessibility having a second ring displayed for the user within the three-dimensional (3D) virtual environment; and when the gesture represents a signal to share the private window, change the status of the private window to a shared window.

\* \* \* \* \*